US012560734B2

(12) United States Patent
Keskes

(10) Patent No.: US 12,560,734 B2
(45) Date of Patent: Feb. 24, 2026

(54) METHOD AND SYSTEM FOR PROCESSING SEISMIC IMAGES TO OBTAIN A REFERENCE RGT SURFACE OF A GEOLOGICAL FORMATION

(71) Applicant: TotalEnergies OneTech, Courbevoie (FR)

(72) Inventor: Noomane Keskes, Pau (FR)

(73) Assignee: TotalEnergies OneTech, Courbevoie (FR)

( * ) Notice: Subject to any disclaimer, the term of this patent is extended or adjusted under 35 U.S.C. 154(b) by 310 days.

(21) Appl. No.: 18/262,703

(22) PCT Filed: Jan. 25, 2021

(86) PCT No.: PCT/IB2021/000058
§ 371 (c)(1),
(2) Date: Jul. 24, 2023

(87) PCT Pub. No.: WO2022/157530
PCT Pub. Date: Jul. 28, 2022

(65) Prior Publication Data
US 2024/0069235 A1 Feb. 29, 2024

(51) Int. Cl.
G01V 1/30 (2006.01)
G01V 1/32 (2006.01)
G01V 1/34 (2006.01)

(52) U.S. Cl.
CPC .............. G01V 1/345 (2013.01); G01V 1/301 (2013.01); G01V 1/325 (2013.01);
(Continued)

(58) Field of Classification Search
CPC .......... G01V 1/301; G01V 1/28; G01V 11/00; G01V 2210/66; G01V 1/345; G01V 20/00;
(Continued)

(56) References Cited

U.S. PATENT DOCUMENTS

| | | | |
|---|---|---|---|
| 9,690,002 B2 * | 6/2017 | Mallet | G01V 1/36 |
| 2008/0212841 A1 * | 9/2008 | Gauthier | G01V 1/32 |
| | | | 382/109 |

(Continued)

FOREIGN PATENT DOCUMENTS

| | | |
|---|---|---|
| CN | 112180468 A | 1/2021 |
| EP | 3978690 A1 | 4/2022 |
| FR | 2869693 A1 | 11/2005 |

OTHER PUBLICATIONS

Geng, Zhicheng, et al. "Deep learning for relative geologic time and seismic horizons." Geophysics 85.4 (2020): WA87-WA100. (Year: 2020).*

(Continued)

*Primary Examiner* — Sumati Lefkowitz
*Assistant Examiner* — Ryan P Potts
(74) *Attorney, Agent, or Firm* — Secd Intellectual Property Law Group LLP

(57) ABSTRACT

A computer-implemented method for processing a seismic image obtained from seismic measurements performed on a geological formation includes determining a relative geological time (RGT) image based on the seismic image; obtaining setpoints for the RGT image; retrieving an RGT surface of the RGT image for each of the setpoints, wherein each point of an RGT surface is defined by a vertical position and at least one horizontal position; and determining a reference RGT surface by combining the RGT surfaces determined for the setpoints. The vertical position of a point of the reference RGT surface is obtained by combining the vertical positions of the points of the RGT surfaces having the same at least one horizontal position as the considered point of the reference RGT surface. The combining of the vertical positions uses weighting coefficients.

13 Claims, 4 Drawing Sheets

(52) U.S. Cl.
CPC .. *G01V 2210/641* (2013.01); *G01V 2210/643* (2013.01); *G01V 2210/661* (2013.01)

(58) Field of Classification Search
CPC .......... G01V 1/282; G01V 1/36; G01V 1/364; G01V 1/362; G01V 2210/643; G01V 1/325; G01V 1/32; G01V 1/48; G01V 1/366; G01V 2210/64; G01V 2210/641; G01V 2210/642; G01V 2210/644; G01V 2210/645; G01V 2210/65; G01V 2210/661; G01V 2210/667; G01V 2210/6161; G01V 2210/21; G01V 2210/43; G01V 1/24; G01V 2210/44; G01V 2210/45; G01V 2210/59; G01V 2210/50; G01V 1/375; E21B 47/00; E21B 47/14; G06T 17/05
See application file for complete search history.

(56) References Cited

U.S. PATENT DOCUMENTS

| | | | |
|---|---|---|---|
| 2009/0204331 A1 | 8/2009 | Lomask et al. | |
| 2010/0149917 A1* | 6/2010 | Imhof | G01V 1/345 |
| | | | 367/53 |
| 2010/0161232 A1* | 6/2010 | Chen | G01V 1/345 |
| | | | 702/16 |
| 2013/0030710 A1* | 1/2013 | Lomask | G01V 1/30 |
| | | | 702/14 |
| 2015/0285931 A1* | 10/2015 | Keskes | G01V 1/301 |
| | | | 382/109 |
| 2021/0215842 A1* | 7/2021 | Liu | G01V 1/302 |
| 2021/0223428 A1* | 7/2021 | Li | G06N 20/00 |
| 2022/0057537 A1* | 2/2022 | Skjæveland | G01N 33/241 |

OTHER PUBLICATIONS

Arouna, Moctar Mounirou, et al. "Robust and adaptive approaches for relative geologic time estimation." Journal of Applied Geophysics 159 (2018): 157-172. (Year: 2018).*

Guillon, Sébastien, et al. "Geotime: A 3D automatic tool for chronostratigraphic seismic interpretation and filtering." The leading edge 32.2 (2013): 154-159. (Year: 2013).*

Bi et al., "3D Relative Geologic Time Estimation with Deep Learning," *2020 Society of Exploration Geophysicists, SEG International Exposition and 90th Annual Meeting, Virtual Event*, Feb. 22-Oct. 16, 2020, pp. 1465-1470.

International Search Report and Written Opinion, mailed Oct. 14, 2021, for International Patent Application No. PCT/IB2021/000058. (12 pages).

Jin et al., "Automatic Seismic Event Tracking Using a Dynamic Time Warping Algorithm," *Journal of Geophysics and Engineering*, vol. 14: 1138-1149, Aug. 2017.

Lomask et al., "Flattening without Picking," *Geophysics 71*(4), Jul. 2006. (9 pages).

Mounirou Arouna et al., "Robust and Adaptive Approaches for Relative Geologic Time Estimation," *Journal of Applied Geophysics*, vol. 159: 157-172, Aug. 2018.

Wu et al., "Horizon vols. with Interpreted Constraints," *Geophysics 80*(2): IM21-IM33, Mar. 2015.

* cited by examiner a)

$S^1$

SET1 b)

$S^2$

SET2 c)

$S_{ref}$

SET1         SET2 a)

$S^{1,2}$

SET1     SEED1     SET2 b)

$S^3$

SET3 c)

$S_{ref}$

SET1     SEED1     SET2     SET3

METHOD AND SYSTEM FOR PROCESSING SEISMIC IMAGES TO OBTAIN A REFERENCE RGT SURFACE OF A GEOLOGICAL FORMATION

BACKGROUND

Technical Field

The present disclosure relates to the processing of seismic images of a geological formation in order to obtain a chrono-stratigraphic representation of the geological formation, a.k.a. relative geological time (RGT) image of the geological formation.

Description of the Related Art

It is known, especially in oil exploration, to determine the position of oil reservoirs from the results of geophysical measurements carried out from the surface or in well bores.

According to the technology of reflection seismology, these seismic measurements involve emitting a wave (e.g., acoustic waves) into the subsurface and measuring a signal comprising a plurality of echoes of the wave on geological structures being investigated. These structures are typically surfaces separating distinct materials, faults, etc. Other measurements may be carried out at wells bores.

Chrono-stratigraphic analysis (or sequence stratigraphic analysis) is very important to understand basin evolution, predict the sedimentary facies distribution for both hydrocarbon exploration and development. This analysis is based on the fundamental assumption that seismic reflectors are surfaces of chrono-stratigraphic significance. This assumption implies that an individual seismic reflector is a "timeline" through a depositional basin that represents a surface of the same geological age (i.e., an isochronous surface in geological time).

A seismic image (or seismic section) comprises a juxtaposition in a volume of sampled one-dimensional signals referred to as seismic traces. In the seismic image, the value of a pixel (a.k.a. voxel for 3D images) is proportional to the seismic amplitude represented by seismic traces.

Computing a chrono-stratigraphic representation of a seismic image often requires determining seismic horizon surfaces of the seismic image, wherein a seismic horizon surface corresponds to an estimated isochronous surface of the geological formation. Such seismic horizon surfaces can be used to determine an RGT image of the geological formation, i.e., an image in which each pixel provides an estimated geological age for the portion of the geological formation represented by said pixel. The RGT image is referred to as "relative" because the purpose of the RGT image is mainly to be able to compare the estimated geological ages of different pixels, in order to, e.g., identify portions of the geological formation that have the same estimated geological age. Also, in practice, it is usually not possible to estimate an absolute geological age of any given portion of the geological formation.

Lomask, et al., "Flattening without picking", Geophysics Volume 71 Issue 4 (July-August 2006), pages P13-P20 (hereinafter "[LOMASK2006]") describes a method for determining seismic horizon surfaces based on a seismic image, by computing the local seismic dip at each pixel of the seismic image and searching iteratively for surfaces having local gradients approaching the local seismic dips. This method relies on a regular grid within the seismic image, usually mapped to the size of the pixels of the seismic image (i.e., the seismic resolution), required for using fast Fourier transforms enabling to reduce computational complexity. However, due to the regular grid used, it is not possible in this method to introduce prior knowledge on, e.g., where the seismic reflectors are located and/or on where faults are located. For this reason, it is not possible in this method to ensure, e.g., that a determined seismic horizon surface corresponds to an actual seismic reflector. The determined seismic horizon surface is any surface deemed to be isochronous in geological time and may as well be a seismic reflector or an isochronous surface located between seismic reflectors. Also, this method will perform poorly in the presence of faults in the geological formation.

BRIEF SUMMARY

The present disclosure aims at improving the situation. In particular, the present disclosure aims at overcoming at least some of the limitations of the prior art discussed above, by proposing a solution for determining RGT surfaces, i.e., isochronous surfaces of the geological formation, by considering some prior knowledge on the geological formation.

According to a first aspect, the present disclosure relates to a computer implemented method for processing a seismic image obtained from seismic measurements performed on a geological formation, said method comprising:

determining an RGT image based on the seismic image;

obtaining setpoints for the RGT image;

retrieving an RGT surface of the RGT image for each of the setpoints, wherein each point of an RGT surface is defined by a vertical position and at least one horizontal position;

determining a reference RGT surface by combining the RGT surfaces determined for the setpoints, wherein the vertical position of a point of the reference RGT surface is obtained by combining the vertical positions of the points of the RGT surfaces having the same at least one horizontal position as the considered point of the reference RGT surface.

Also, combining of the vertical positions of the points of the vertical surfaces uses weighting coefficients, wherein the value of a weighting coefficient used for the vertical position of an RGT surface decreases with a distance between the at least one horizontal position of the considered point of the reference RGT surface and the at least one horizontal position of the setpoint associated to the considered RGT surface.

Hence the processing method computes an RGT image based on the seismic image. Computing the RGT image may use any method known to the skilled person, including any method for determining seismic horizon surfaces of the seismic image known to the skilled person.

Then setpoints are obtained, which may represent constraints to be satisfied by a reference RGT surface. For instance, the setpoints may be determined based on measurements performed at a well bore in the geological formation or may correspond to points positioned manually in the seismic image and/or in the RGT image by a human interpreter, which are considered by the human interpreter to correspond to different points of a same seismic reflector.

For each setpoint, an RGT surface is retrieved from the RGT image, i.e., estimated isochronous surfaces are retrieved for each setpoint received.

Then the reference RGT surface, i.e., the RGT surface that takes into account the setpoints received, is obtained by combining the RGT surfaces retrieved for the received setpoints. Basically, for a given horizontal position, the vertical position of a point of the reference RGT surface is influenced mainly by the vertical position of the point of the RGT surface retrieved for the setpoint that is closest in the horizontal plane with the considered horizontal position.

Hence, the setpoints, i.e., the constraints/prior knowledge on the geological formation, are not used for determining the seismic horizon surfaces and/or the RGT image but are used afterwards to combine RGT surfaces retrieved from the RGT image for the received setpoints. By taking into account the setpoints when determining the reference RGT surface, better results can be obtained, e.g., in the presence of faults in the geological formation.

In specific embodiments, the processing method can further comprise one or more of the following features, considered either alone or in any technically possible combination.

In specific embodiments, obtaining setpoints for the RGT image comprises obtaining a patch of points of the RGT image, said patch of points having a boundary, wherein the setpoints comprise points located on the boundary of the patch of points, and wherein the reference RGT surface between setpoints located on the boundary of the patch of points is obtained from said patch of points.

In such a case, it is possible to consider constraints that correspond to patches of points. The patches of points may be included as such in the reference RGT image, while the RGT surfaces are combined to obtain the points of the reference RGT image which are located, e.g., between different patches of points, the setpoints being points on the boundaries of the patches of points.

In specific embodiments, obtaining a patch of points comprises defining a seed on a seismic trace of the seismic image and propagating laterally the seed by searching for pixels of adjacent seismic traces that satisfy a predetermined criterion of similarity with the seed.

In such a case, the seeds may be determined based on measurements performed at a well bore in the geological formation or may correspond to points positioned manually in the seismic image and/or in the RGT image by a human interpreter, which are considered by the human interpreter to correspond to different points of a same seismic reflector. Then these seeds are propagated laterally by, e.g., correlation between adjacent seismic traces of the seismic image in order to produce the patches of points. Hence, this method may be used to combine different approaches such as correlation-based methods and seismic dip based methods (such as [LOMASK2006]).

In specific embodiments, the value of a weighting coefficient used for the vertical position of an RGT surface is:

substantially equal to one if the at least one horizontal position of the considered point of the reference RGT surface is equal to the at least one horizontal position of the setpoint associated to the considered RGT surface;
  substantially equal to zero if the at least one horizontal position of the considered point of the reference RGT surface is equal to the at least one horizontal position of the setpoint associated to a different RGT surface.

In specific embodiments:

$$S_{ref}(i, j) = \sum_{n=1}^{N_{setpoint}} w^n(i, j) \times S^n(i, j)$$

wherein:
  $S_{ref}(i,j)$ is the vertical position of the point of the reference RGT surface $S_{ref}$ having the horizontal positions $(i,j)$;
  $N_{setpoint}$ is the number of setpoints;
  $S^n$ is the RGT surface retrieved for the setpoint of index n $(1 \leq n \leq N_{setpoint})$;
  $S^n(i,j)$ is the vertical position of the point of the RGT surface $S^n$ having the horizontal positions $(i,j)$;
  $w^n(i,j)$ is the weighting coefficient used for the vertical position of the RGT surface $S^n$ for the horizontal positions $(i,j)$.

In specific embodiments:

$$\begin{cases} w^n(i_n, j_n) = 1 \text{ and } w^n(i_m, j_m) = 0 \forall m \neq n \\ w^n(i, j) = \dfrac{F^n(i, j)}{F(i, j)} \text{ if } (i, j) \neq (i_n, j_n) \text{ and } (i, j) \neq (i_m, j_m) \forall m \neq n \end{cases}$$

wherein:

$$F^n(i, j) = [dist((i, j), (i_n, j_n))]^{-\alpha}$$

$$F(i, j) = \sum_{n=1}^{N_{setpoint}} F^n(i, j)$$

wherein:
  $(i_n, j_n)$ are the horizontal positions of the setpoint of index n $(1 \leq n \leq N_{setpoint})$;
  $dist((i,j), (i_n, j_n))$ is the distance in the horizontal plane between the point having the horizontal positions $(i,j)$ and the horizontal positions $(i_n, j_n)$ of the setpoint of index n $(1 \leq n \leq N_{setpoint})$;
  $\alpha > 1$ is a predetermined factor.

In specific embodiments:

$$w^n(i, j) = \frac{F'^n(i, j)}{F'(i, j)}$$

wherein:

$$F'^n(i, j) = \frac{1}{\exp([dist((i, j), (i_n, j_n))]^{\alpha})}$$

$$F'(i, j) = \sum_{n=1}^{N_{setpoint}} F'^n(i, j)$$

wherein:
  $(i_n, j_n)$ are the horizontal positions of the setpoint of index n;
  $dist((i,j), (i_n, j_n))$ is the distance in the horizontal plane between the point having the horizontal positions $(i,j)$ and the horizontal positions $(i_n, j_n)$ of the setpoint of index n;
  $\alpha > 1$ is a predetermined factor.

In specific embodiments, $\alpha > 2$ and/or $\alpha < 60$.

In specific embodiments, the processing method comprises converting to frequency-domain the reference RGT surface.

In specific embodiments, converting to frequency-domain the reference RGT surface comprises:
  determining an intersection point between each seismic trace and the reference RGT surface;

selecting an interval of pixels of each seismic trace, said interval of pixels being centered on the intersection point;

converting to frequency domain the values of each interval of pixels, thereby obtaining a plurality of frequency-domain representations of the reference RGT surface associated to respective analysis frequencies.

In specific embodiments, the processing method comprises selecting three analysis frequencies and generating a red-green-blue (RGB) image of the reference RGT surface based on the three frequency-domain representations associated respectively to the three selected analysis frequencies.

According to a second aspect, the present disclosure relates to a computer program product comprising instructions which, when executed by at least one processor, configure said at least one processor to carry out a processing method according to any one of the embodiments of the present disclosure.

According to a third aspect, the present disclosure relates to a non-transitory computer-readable storage medium comprising instructions which, when executed by at least one processor, configure said at least one processor to carry out a processing method according to any one of the embodiments of the present disclosure.

According to a fourth aspect, the present disclosure relates to a computer system for processing a seismic image, said computer system comprising at least one processor configured to carry out a processing method according to any one of the embodiments of the present disclosure.

BRIEF DESCRIPTION OF DRAWINGS

The disclosure will be better understood upon reading the following description, given as an example that is in no way limiting, and made in reference to the figures which show.

In these figures, identical references from one figure to another designate identical or analogous elements. For reasons of clarity, the elements shown are not to scale, unless explicitly stated otherwise.

DETAILED DESCRIPTION

As discussed above, the present disclosure relates inter alia to a method 30 for processing seismic images.

A seismic image represents a picture of the subsoil arising from a seismic exploration survey. The seismic image comprises at least two dimensions which may comprise at least one horizontal dimension (which usually uses a distance scale, expressed, e.g., in meters) and one vertical dimension (which usually uses a distance scale or a time scale, expressed, e.g., in seconds). Hence, the seismic image may correspond to a 3D seismic image (with two horizontal dimensions and one vertical dimension) or to a 2D seismic image (with one horizontal dimension and one vertical dimension).

It is emphasized that the expressions "horizontal dimension" and "vertical dimension" are not to be interpreted as requiring these dimensions to be respectively strictly horizontal and strictly vertical. These expressions mean that one of the dimensions, referred to as "vertical dimension," is representative of the depth of the geological formation, and that the other dimensions, referred to as "horizontal dimensions" are both orthogonal to the vertical dimension.

The seismic image is composed of pixels which may be 2D in case of a 2D seismic image or 3D (voxels) in case of a 3D seismic image. The pixels are regularly distributed according to a horizontal resolution on each horizontal dimension and a vertical resolution on the vertical dimension. The seismic image comprises, along each horizontal dimension:

a number of columns of pixels which is equal to the quotient of the horizontal extension along this horizontal dimension divided by the horizontal resolution along this horizontal dimension; each column of the seismic image may be referred to as "seismic trace"; and a number of pixels per column which is equal to the quotient of the vertical extension divided by the vertical resolution.

Each pixel is associated with a seismic value which may be a gray value, for instance between 0 and 255 (or 65535). Each seismic value is representative of the amplitude of the seismic signal measured for the portion of the geological formation represented by the corresponding pixel.

In the sequel, a point corresponds to a set of coordinates in the grid of the seismic image, i.e., a set comprising a horizontal position along each horizontal dimension and a vertical position along the vertical dimension. A pixel therefore corresponds to a point with a value associated thereto (i.e., a seismic value in the case of a pixel of the seismic image, an estimated geological age in the case of a pixel of the RGT image, etc.).

Figure 1:
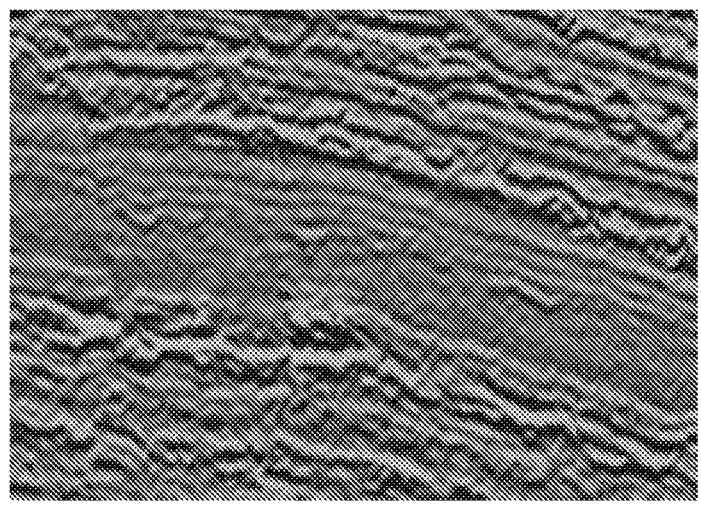
FIG. 1 provides an example of seismic image.

FIG. 1 represents an example of seismic image. The seismic image represented by FIG. 1 is 2D and may correspond to a 2D seismic image or to a 2D section of a 3D seismic image, in a vertical plane comprising one of its horizontal dimensions. As can be seen in FIG. 1, the seismic values highlight the composition of the geological formation, since high amplitude seismic values are usually associated to strong seismic reflectors, which are usually located at the interfaces between geological layers having different acoustic impedances.

Figure 2:
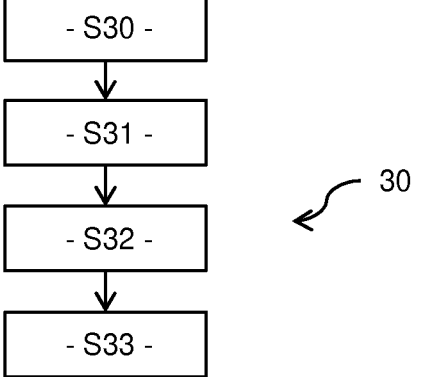
FIG. 2 is a flow chart illustrating the main steps of a method for processing a seismic image.

FIG. 2 represents schematically the main steps of an exemplary embodiment of a method 30 for processing a seismic image.

The processing method 30 is carried out by a computer system (not represented in the figures). In preferred embodiments, the computer system comprises one or more processors (which may belong to a same computer or to different computers) and storage means (magnetic hard disk, optical disk, electronic memory, or any computer readable storage medium) in which a computer program product is stored, in the form of a set of program-code instructions to be executed in order to implement all or part of the steps of the processing method 30. Alternatively, or in combination thereof, the computer system can comprise one or more programmable logic circuits (FPGA, PLD, etc.), and/or one or more specialized application specific integrated circuits (ASIC), etc., adapted for implementing all or part of said steps of the processing method 30. In other words, the computer system comprises a set of means configured by software (specific computer program product) and/or by hardware (processor, FPGA, PLD, ASIC, etc.) to implement the steps of the processing method 30.

As illustrated by FIG. 2, the processing method 30 comprises a step S30 of determining an RGT image based on the seismic image.

This step S30 of determining an RGT image may use any method known to the skilled person. For instance, determining the RGT image based on the seismic image may rely on determining seismic horizon surfaces. Preferably a seismic horizon surface may be determined for a plurality of local extrema of a plurality of seismic traces of the seismic image, i.e., each seismic horizon surface determined comprises a local extremum of a seismic trace. Determining seismic horizon surfaces may use any method know to the skilled person for determining seismic horizon surfaces, for instance the method described in [LOMASK2006], in the patent applications EP 20306131.2 and FR 2869693, etc.

Then, the RGT image may be computed based on the seismic horizon surfaces as follows.

We assume that $M_h$ seismic horizon surfaces $\tau^n$ ($1 \leq n \leq M_h$) have been determined, preferably distributed throughout the vertical dimension of the seismic image. Assuming that the seismic image comprises a horizontal dimension x with $N_x$ pixels, a horizontal dimension y with $N_y$ pixels and a vertical dimension t with $N_t$ pixels, then the seismic horizon surface $\tau^n$ of index n is the following set of points of the seismic image $\{(i, j, \tau^n(i,j)), 1 \leq i \leq N_x, 1 \leq j \leq N_y\}$.

For example, the value of each pixel of the RGT image may correspond to the number of seismic horizon surfaces that comprise said considered pixel or that comprise any pixel located in the same column as the considered pixel, between the considered pixel and a reference pixel in the same column. The reference pixel on the vertical axis is the pixel of index $k=N_t$ or, preferably, the pixel of index $k=1$.

For instance, it is possible to compute a stack image STK. The value of each pixel of the stack image STK corresponds to the number of seismic horizon surfaces that comprise said considered pixel. We can define a function Pos(i, j, k, n) which is such that:

$$Pos(i, j, k, n) = \begin{cases} 1 & \text{if } \tau^n(i, j) = k \\ 0 & \text{if } \tau^n(i, j) \neq k \end{cases}$$

Hence, the function Pos(i, j, k, n) indicates whether the seismic horizon surface $\tau^n$ passes by the pixel having the position (i,j,k). Based on the function Pos(i, j, k, n), the stack image STK may be computed as follows:

$$STK(i,j,k) = \Sigma_{n=1}^{M_h} Pos(i,j,k,n)$$

for each $1 \leq i \leq N_x$, $1 \leq j \leq N_y$, $1 \leq k \leq N_t$, or limited to the pixels which are located inside a predetermined survey volume in the seismic image.

Then, assuming that the reference pixel is the pixel of index k=1, the RGT image may be computed as follows:

$$RGT(i,j,k) = \Sigma_{l=1}^{k} STK(i,j,l)$$

for each $1 \leq i \leq N_x$, $1 \leq j \leq N_y$, $1 \leq k \leq N_t$, or limited to the pixels which are located inside the survey volume. For the purpose of chrono-stratigraphic analysis, it is possible, in some embodiments, to normalize the RGT image by a predetermined reference geological age, such that the maximum value of the pixels of the RGT image is equal to the reference geological age. Hence, in the present example, the pixels which represent the deepest portions of the geological formation, at least, will have their values equal to the reference geological age.

As illustrated by FIG. 2, the processing method 30 comprises also a step S31 of obtaining at least two setpoints for the RGT image.

The setpoints represent constraints to be satisfied by a reference RGT surface to be determined. For instance, the setpoints may be determined based on measurements performed at a well bore in the geological formation. Preferably, the setpoints may correspond to points positioned manually in the seismic image and/or in the RGT image by a human interpreter, in which case said setpoints may correspond to points considered by the human interpreter to belong to a same seismic reflector.

In order to facilitate the positioning of the setpoints by a human interpreter, it is possible, in preferred embodiments, to compute an RGT seismic image based on both the RGT image and the seismic image. Basically, the RGT seismic image merges the RGT image with the seismic image by superimposing the RGT image on the seismic traces of the seismic image. For instance, different colors may be used for different layers having substantially the same estimated geological age in the RGT image, and different shades of the color may be used for different seismic values of the seismic traces. For instance, if the color "blue" is used for a given layer of pixels having substantially the same geological age, a "dark blue" may be used for a high seismic value and a "light blue" may be used for a low seismic value of the seismic traces. Such provisions are advantageous in that they allow the human interpreter to visualize simultaneously the estimated geological age of each pixel and its seismic value from the seismic image, thereby facilitating the detection of seismic reflectors. The purpose of positioning the setpoints may be to apply slight corrections to the RGT image. The human interpreter uses the RGT seismic image to detect seismic reflectors and provides setpoints that are considered to have the same real geological age while their respective estimated geological ages in the RGT image may be different. Indeed, the presence of a fault in the geological formation may introduce errors in the estimated geological ages of some pixels of the RGT image, and the setpoints may be positioned to introduce some knowledge regarding points that should be considered to have the same real geological age, in order to compensate for said errors.

We assume that $N_{setpoint} \geq 2$ setpoints are obtained. The position of the setpoint of index n ($1 \leq n \leq N_{setpoint}$) is given by ($i_n$, $j_n$, $k_n$), wherein ($i_n$, $j_n$) are the horizontal positions of the setpoint and $k_n$ its vertical position.

As illustrated by FIG. 2, the processing method 30 comprises a step S32 of retrieving an RGT surface of the RGT image for each of the setpoints. If we denote by $S^n$ the RGT surface retrieved from the RGT image for the setpoint of index n ($1 \leq n \leq N_{setpoint}$), then it corresponds to the following set of points of the RGT image $\{(i, j, S^n(i,j)), 1 \leq i \leq N_x, 1 \leq j \leq N_y\}$, wherein $$RGT(i,j,S^n(i,j)) = RGT(i_n, j_n, k_n)$$

for each $1 \leq i \leq N_x$, $1 \leq j \leq N_y$, or limited to the pixels which are located inside the survey volume. $S^n(i,j)$ is therefore the vertical position of the point (i, j, $S^n(i,j)$) of the RGT surface $S^n$ having the horizontal positions (i,j). The RGT surface $S^n$ comprises the setpoint ($i_n$, $j_n$, $k_n$) of index n, i.e., $S^n(i_n, j_n) = k_n$.

Of course, the sequence of the steps of the processing method 30, as illustrated by FIG. 2, is only illustrative and other sequences are possible. For instance, steps S31 and S32 may be combined. Indeed, it is possible to obtain a first setpoint and to retrieve a first RGT surface associated to said first setpoint. The first RGT surface may then be displayed, e.g., on a seismic image or an RGT seismic image, to enable a human interpreter to position a second setpoint, e.g., in a position where the human interpreter considers that the first RGT surface should be corrected. Then a second RGT surface may be retrieved, etc.

As illustrated by FIG. 2, the processing method 30 comprises a step S33 of determining a reference RGT surface by combining the RGT surfaces $S^n$ ($1 \leq n \leq N_{setpoint}$) determined for the setpoints. Basically, the vertical position $S_{ref}(i,j)$ of a point $(i, j, S_{ref}(i,j))$ of the reference RGT surface $S_{ref}$ is obtained by combining the vertical positions $S^n(i,j)$ of the points of the RGT surfaces having the same horizontal positions $(i,j)$ as the considered point of the reference RGT surface $S_{ref}$. In other words:

$$S_{ref}(i, j) = \sum_{n=1}^{N_{setpoint}} w^n(i, j) \times S^n(i, j)$$

wherein $w^n(i,j) \geq 0$ is the weighting coefficient used for the vertical position of the RGT surface $S^n$ for the horizontal positions $(i,j)$.

Also, the value of a weighting coefficient (which is $\geq 0$) used for the vertical position $S^n(i,j)$ of an RGT surface $S^n$ decreases with a distance in the horizontal plane between the horizontal positions $(i,j)$ of the considered point $(i, j, S_{ref}(i,j))$ of the reference RGT surface $S_{ref}$ and the horizontal positions $(i_n, j_n)$ of the setpoint associated to the considered RGT surface $S^n$. In other words:

$$\text{dist}((i',j'),(i_n,j_n)) > \text{dist}((i,j),(i_n,j_n)) \Rightarrow w^n(i',j') < w^n(i,j)$$

wherein $\text{dist}((i,j), (i_n, j_n))$ is the distance in the horizontal plane between the point having the horizontal positions $(i,j)$ and the horizontal positions $(i_n, j_n)$ of the setpoint of index n ($1 \leq n \leq N_{setpoint}$). Any mathematical formula for computing a distance between two points may be used, and in particular any p-norm distance. Preferably, the 2-norm distance (a.k.a. Euclidian distance) is used:

$$\text{dist}((i,j),(i_m,j_n)) = \sqrt{(i-i_n)^2 + (j-j_n)^2}$$

Hence, with such weighting coefficients $w^n(i,j)$, the contribution to the reference RGT surface $S_{ref}$ of an RGT surface $S^n$ (and its influence thereof) diminishes with the distance to the setpoint associated to said RGT surface $S^n$. In other words, the RGT surface $S^n$ of index n is considered to be more accurate in the vicinity of its setpoint than any other RGT surface $S^m$ of index $m \neq n$.

In preferred embodiments, the value of a weighting coefficient $w^n(i,j)$ used for the vertical position $S^n(i,j)$ of an RGT surface $S^n$ is:

- substantially equal to one, preferably equal to one, if the horizontal positions $(i,j)$ of the considered point of the reference RGT surface $S_{ref}$ are equal to the horizontal positions $(i_n, j_n)$ of the setpoint associated to the considered RGT surface $S^n$;
- substantially equal to zero, preferably equal to zero, if the horizontal positions $(i,j)$ of the considered point of the reference RGT surface $S_{ref}$ are equal to the horizontal positions $(i_m, j_m)$ of the setpoint associated to a different RGT surface $S^m$ of index $m \neq n$.

By "substantially equal to one," we mean that $0.95 \leq w^n(i_n, j_n) \leq 1$, or even $0.99 \leq w^n(i_n, j_n) \leq 1$. By "substantially equal to zero," we mean that $0 \leq w^n(i_m, j_m) \leq 0.05$, or even $0 \leq w^n(i_m, j_m) \leq 0.01$, $m \neq n$.

According to a non-limitative example, the weighting coefficients $w^n(i,j)$ used for weighting the vertical positions $S^n(i,j)$ of an RGT surface $S^n$ are given by the following expressions:

$$\begin{cases} w^n(i_n, j_n) = 1 \text{ and } w^n(i_m, j_m) = 0 \forall\, m \neq n \\ w^n(i, j) = \dfrac{F^n(i, j)}{F(i, j)} \text{ if } (i, j) \neq (i_n, j_n) \text{ and } (i, j) \neq (i_m, j_m) \forall\, m \neq n \end{cases}$$

wherein:

$$F^n(i, j) = [\text{dist}((i, j), (i_n, j_n))]^{-\alpha}$$

$$F(i, j) = \sum_{n=1}^{N_{setpoint}} F^n(i, j)$$

wherein $\alpha > 1$ is a predetermined factor. In preferred embodiments, $\alpha > 2$ and/or $\alpha < 60$. Basically, the factor $\alpha$ defines how the influence of an RGT surface $S^n$ decreases with the distance to its setpoint, i.e., with $\text{dist}((i,j), (i_n, j_n))$. Hence, the higher the factor $\alpha$, the quicker the influence of an RGT surface $S^n$ decreases with the distance to its setpoint.

According to another non-limitative example, the weighting coefficients $w^n(i,j)$ used for weighting the vertical positions $S^n(i,j)$ of an RGT surface $S^n$ are given by the following expressions:

$$w^n(i, j) = \frac{F'^n(i, j)}{F'(i, j)}$$

wherein:

$$F'^n(i, j) = \frac{1}{\exp([\text{dist}((i, j), (i_n, j_n))]^{\alpha})}$$

$$F'(i, j) = \sum_{n=1}^{N_{setpoint}} F'^n(i, j)$$

Figure 3:
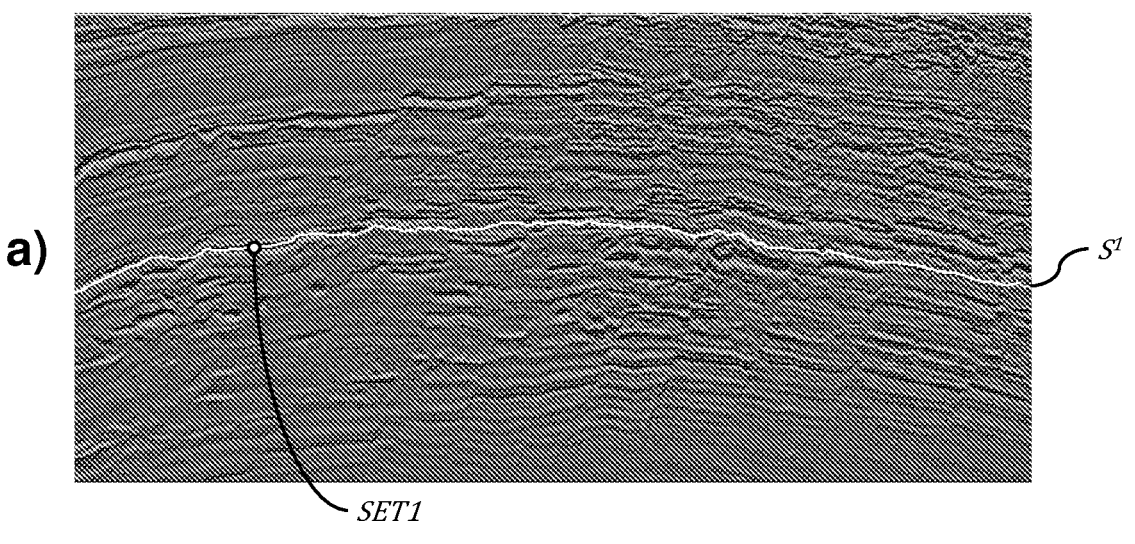
FIG. 3 provides examples of RGT surfaces obtained for setpoints and of a reference RGT surface obtained based on said RGT surfaces.
Figure 3:
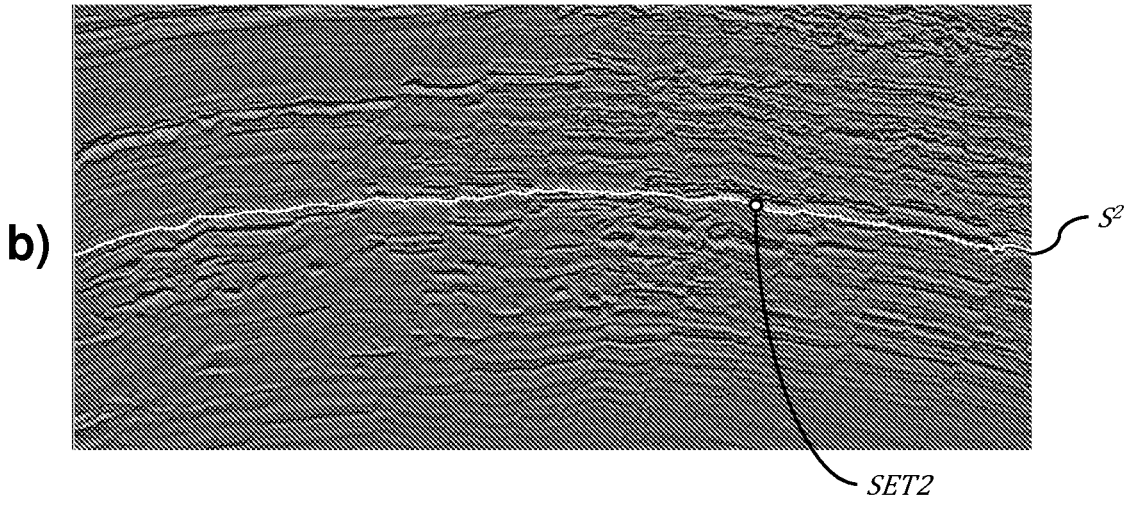
Figure 3:
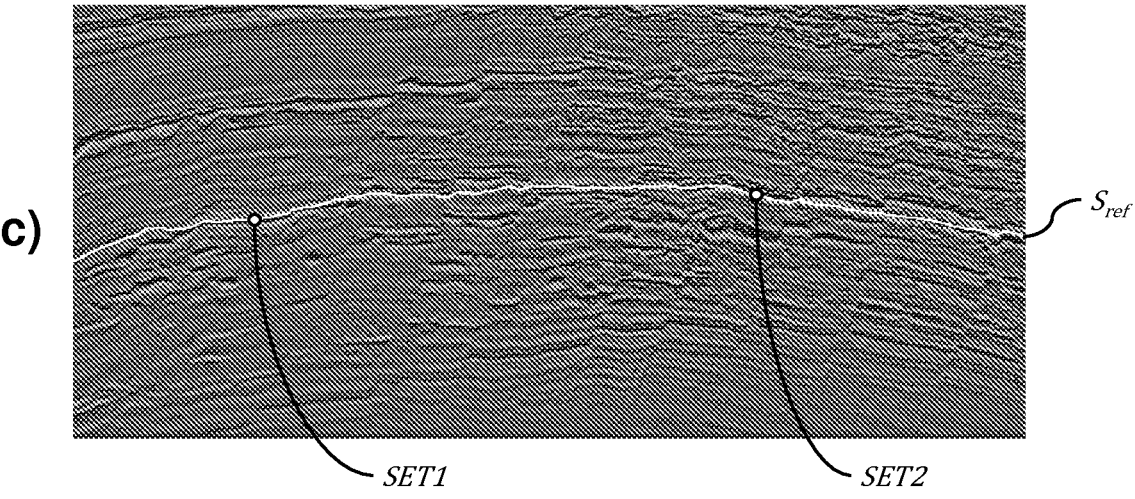

FIG. 3 represents an example of reference RGT surface $S_{ref}$ obtained based on RGT surfaces $S^n$. The image represented by FIG. 3 corresponds to a 2D section of a 3D seismic image, in a vertical plane comprising one of its horizontal dimensions. In FIG. 3, we consider two setpoints ($N_{setpoint}=2$). Part a) of FIG. 3 represents schematically a first setpoint SET1 and its retrieved RGT surface $S^1$. Part b) of FIG. 3 represents schematically a second setpoint SET2 and its retrieved RGT surface $S^2$. Finally, part c) of FIG. 3 represents schematically the reference RGT surface $S^{ref}$ obtained by combining the RGT surfaces $S^1$ and $S^2$. As can be seen in part c) of FIG. 3, the reference RGT surface $S_{ref}$, in this example, passes by the two setpoints SET1 and SET2 (i.e., $w^n(i_n, j_n)=1$ and $w^n(i_m, j_m)=0 \forall m \neq n$).

In preferred embodiments, obtaining setpoints for the RGT image comprises obtaining a patch of points of the RGT image used as a constraint. Basically, such a patch of points corresponds to a bounded surface constraining the reference RGT surface $S_{ref}$, i.e., that is to be included in the reference RGT surface $S_{ref}$ as a portion of said reference RGT surface $S_{ref}$. In such a case, the setpoints for which RGT surfaces $S''$ are to be retrieved correspond to points located on a boundary of the patch of points. Hence, between setpoints located on the boundary of a same patch of points, the reference RGT surface $S_{ref}$ is equal to said patch of points RGT, and the RGT surfaces $S''$ retrieved for the setpoints are combined to determine the reference RGT surface $S_{ref}$ outside the obtained patches of points. Hence, all that has been described hereinabove still applies for combining the RGT surfaces $S''$ outside the patches of points.

A patch of points may for instance be derived from measurements performed at a well bore in the geological formation and/or from seeds positioned manually by human interpreters.

Figure 4:
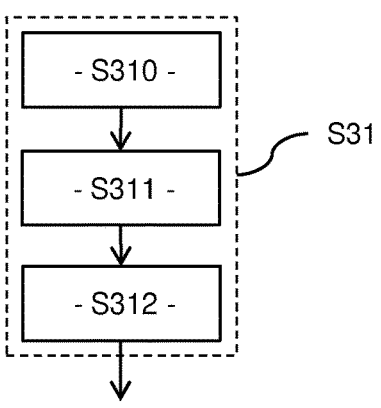
FIG. 4 is a flow chart illustrating the main steps of a preferred embodiment of a step of obtaining setpoints.

FIG. 4 represents schematically the main steps of a preferred embodiment of the step S31 of obtaining the setpoints.

As illustrated by FIG. 4, the step S31 of obtaining the setpoints comprises a step S310 of obtaining a seed on at least one seismic trace. The seed may be, e.g., derived from measurements at a well bore or positioned manually by a human interpreter.

As illustrated by FIG. 4, the step S31 of obtaining the setpoints comprises also, for each seed, a step S311 of processing the seismic image (by the computer system) to propagate laterally the seed by searching for pixels of adjacent seismic traces that satisfy a predetermined criterion of similarity with the seed. For instance, the lateral search may be performed by correlating an adjacent seismic trace with vertically translated copies of the seismic trace comprising the seed in order to identify the vertical translation that optimizes the similarity (e.g., maximum correlation value and/or correlation value above a predetermined threshold) with the seismic trace comprising the seed.

The pixels around a seed that satisfy the similarity criterion with said seed, and their respective positions in the seismic image, define the patch of points associated this this seed.

As illustrated by FIG. 4, the step S31 of obtaining the setpoints comprises also a step S312 of selecting setpoints on the boundary of each patch of points obtained by processing the seismic image.

Similarity based methods are known to yield results that are accurate in the vicinity of the seeds. Hence, if a seed is positioned on a seismic reflector, similarity based methods are able to identify pixels of adjacent seismic traces which correspond to the same seismic reflector with a good accuracy at least in the vicinity of the seed. However, such similarity based methods perform poorly in the presence of, e.g., noise, where seismic dip based methods (such as [LOMASK2006]) usually provide better results. This method may be used to combine different approaches, and the advantages thereof, such as similarity based methods for determining patches of points and seismic dip based methods for determining the RGT surfaces.

Figure 5:
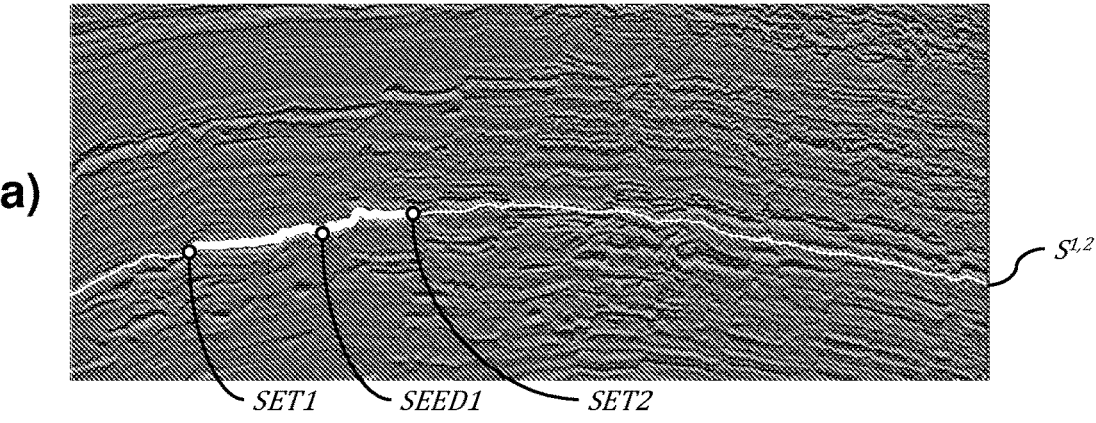
FIG. 5 provides examples of a patch of points obtained for a seed, and of RGT surfaces obtained for setpoints, and of a reference RGT surface obtained based on said RGT surfaces and on said patch of points.
Figure 5:
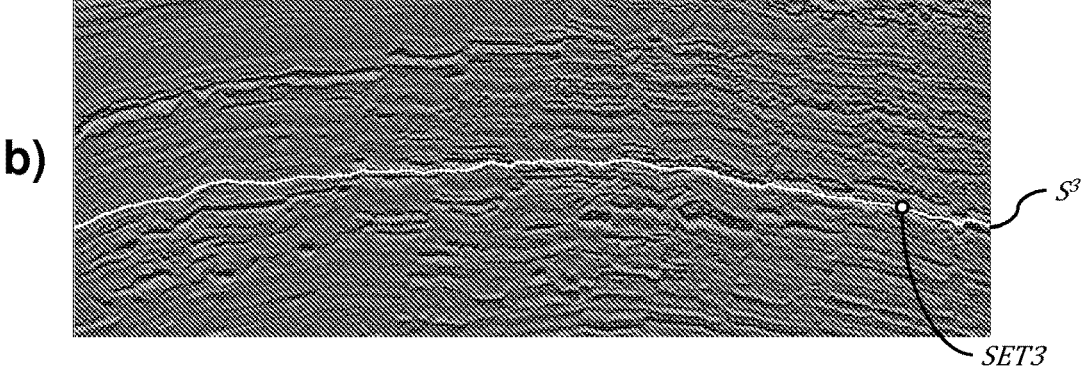
Figure 5:
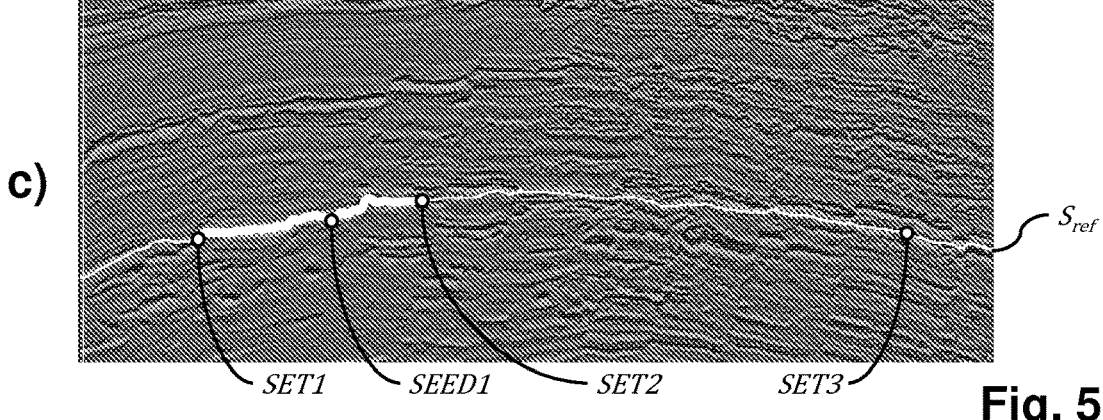

FIG. 5 represents an example of reference RGT surface $S_{ref}$ obtained based on a patch of points and based on RGT surfaces $S''$. The image represented by FIG. 5 corresponds to a 2D section of a 3D seismic image, in a vertical plane comprising one of its horizontal dimensions. Part a) of FIG. 5 represents schematically a patch of points obtained by propagating laterally a seed SEED1. In the 2D section represented by FIG. 5, the boundary of the patch of points comprises two setpoints SET1 and SET2, and part a) of FIG. 5 represents an RGT surface $S^{1,2}$ obtained by combining the RGT surfaces $S^1$ and $S^2$ retrieved for the setpoints SET1 and SET2. Part b) of FIG. 5 represents schematically a third setpoint SET3 and its retrieved RGT surface $S^3$. Finally, part c) of FIG. 5 represents schematically the reference RGT surface $S_{ref}$ obtained by combining the patch of points and the RGT surfaces $S^{1,2}$ and $S^3$. As can be seen in part c) of FIG. 5, the reference RGT surface $S_{ref}$ passes by all three setpoints SET1, SET2 and SET3, and is equal to the patch of points where the patch of points is defined.

Figure 6:
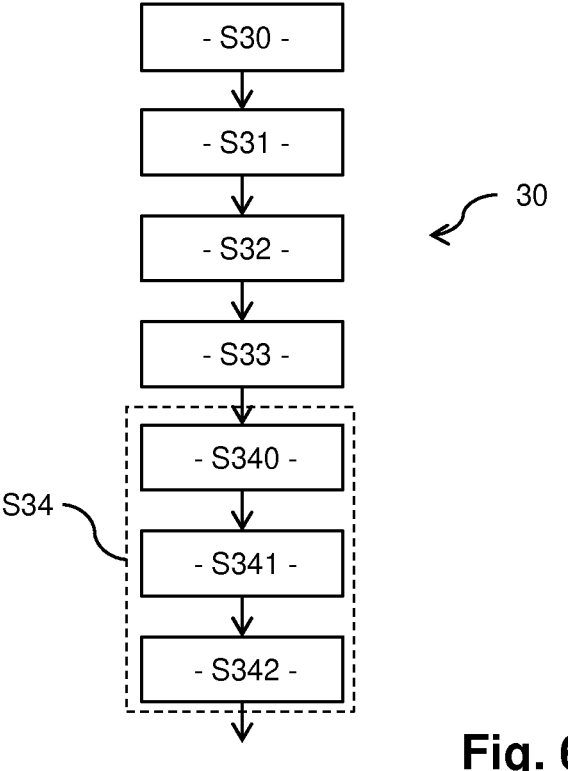
FIG. 6 is a flow chart illustrating the main steps of a preferred embodiment of the processing method.

FIG. 6 represents schematically the main steps of a preferred embodiment of the processing method 30. As illustrated by FIG. 6, the processing method 30 comprises, in addition to the steps described in reference to FIG. 2, a step S34 of converting to frequency-domain the reference RGT surface $S_{ref}$. For instance, and as illustrated in a non-limitative manner by FIG. 6, the frequency-domain conversion step S34 may comprise:

- a step S340 of determining an intersection point between each seismic trace of the seismic image and the reference RGT surface $S_{ref}$;
- a step S341 of selecting an interval of pixels for each seismic trace, each interval of pixels being centered on the intersection point of the considered seismic trace;
- a step S342 of converting to frequency domain the values of each interval of pixels.

During step S340, the intersection point of the reference RGT surface $S_{ref}$ with each seismic trace of the seismic image is determined. Basically, for the seismic trace (column of the seismic image) having the horizontal positions $(i,j)$, then the intersection point corresponds to the point $(i, j, S_{ref}(i,j))$.

We denote by $I_s$ the seismic image, which corresponds to the set of pixels $\{I_s(i,j,k), 1 \le i \le N_x, 1 \le j \le N_y, 1 \le k \le N_t\}$. During step S341, intervals of pixels centered on the intersection points are determined for each seismic trace of the seismic image $I_s$. If we assume that each interval of pixels comprises $N_{int} = (2 \times N_{int/2})$ pixels, the interval of pixels for the seismic trace having the horizontal positions $(i,j)$ may correspond to the set of pixels:

$$\{I_s(i,j,S_{ref}(i,j)-N_{int/2}+k),1 \le k \le N_{int}\}$$

Figure 7:
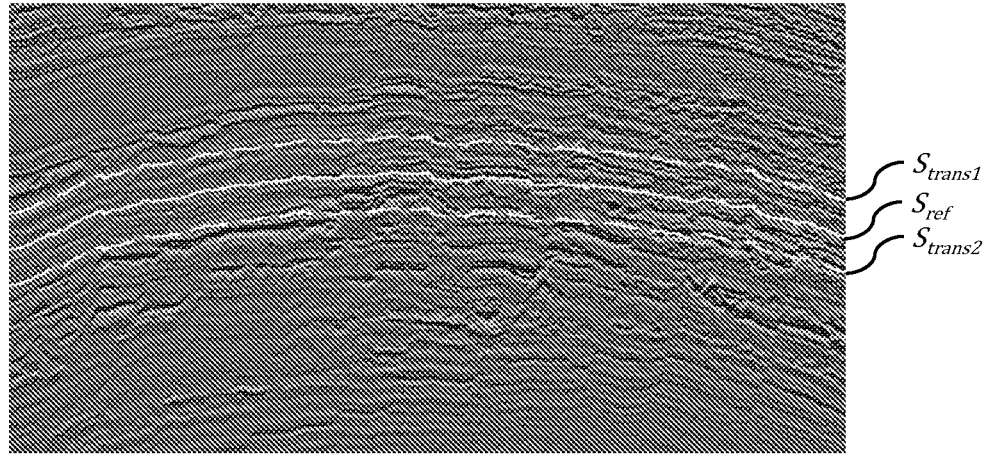
FIG. 7 provides examples of interval of pixels on seismic traces of a seismic image, to be used for frequency-domain conversion.

FIG. 7 represents schematically the intervals of pixels centered on a reference RGT surface $S_{ref}$. Basically, the intervals of pixels lie between two boundary surfaces $S_{trans1}$ and $S_{trans2}$ (represented by white discontinuous lines in FIG. 7) obtained by translating the reference RGT surface $S_{ref}$ by respectively $(-N_{int/2}+1)$ and $N_{int/2}$ pixels along the vertical dimension.

Then during step S342, the values of each interval of pixels are converted into frequency-domain. This frequency-domain conversion may use any method known to the skilled person, for instance a Fourier transform and preferably a Sparse Fourier Transform (SFT). Hence, a frequency-domain representation is obtained for each interval of pixels, over a plurality of analysis frequencies. For a given analysis frequency, the set of frequency-domain values obtained for all the intervals of pixels corresponds to a frequency-domain representation of the reference RGT surface $S_{ref}$. Hence, the frequency-domain conversion step S342 provides a plurality frequency-domain representations of the reference RGT surface $S_{ref}$ associated to respective analysis frequencies.

These frequency-domain representations of the reference RGT surface $S_{ref}$ may be used by a human interpreter to analyze the geological formation. In preferred embodiments, in order to facilitate the analysis by the human interpreter, it is possible to display a red-green-blue (RGB) image of the frequency-domain representations of the reference RGT surface $S_{ref}$. For instance, it is possible to select three analysis frequencies $f_1$, $f_2$, $f_3$, and to generate the RGB image of the reference RGT surface $S_{ref}$ based on the three frequency-domain representations associated respectively to the three selected analysis frequencies $f_1$, $f_2$, $f_3$. For instance, if $f_1 < f_2 < f_3$, then it is possible to:

display the frequency-domain representation associated to the analysis frequency $f_1$ on the red channel of the RGB image;

display the frequency-domain representation associated to the analysis frequency $f_2$ on the green channel of the RGB image;

display the frequency-domain representation associated to the analysis frequency $f_3$ on the blue channel of the RGB image.

It is emphasized that the present disclosure is not limited to the above exemplary embodiments. Variants of the above exemplary embodiments are also within the scope of the present disclosure.

The various embodiments described above can be combined to provide further embodiments. All of the patents, applications, and publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method implemented by a computer for processing a seismic image obtained from seismic measurements performed on a geological formation, said method comprising:

determining a relative geological time (RGT) image based on the seismic image;

obtaining setpoints for the RGT image, said setpoints representing constraints to be satisfied by a reference RGT surface to be determined;

retrieving an RGT surface of the RGT image for each of the setpoints, wherein each point of an RGT surface is defined by a vertical position and at least one horizontal position; and determining the reference RGT surface by combining the RGT surfaces determined for the setpoints, wherein a vertical position of a respective point of the reference RGT surface is obtained by combining the vertical positions of the points of the RGT surfaces having a same at least one horizontal position as the respective point of the reference RGT surface;

wherein said combining of the vertical positions uses weighting coefficients; and wherein a value of a weighting coefficient used for the vertical position of an RGT surface decreases with a distance increasing between the at least one horizontal position of the respective point of the reference RGT surface and the at least one horizontal position of the setpoint associated with a respective RGT surface.

2. The method according to claim 1, wherein obtaining setpoints for the RGT image comprises obtaining a patch of points of the RGT image, said patch of points having a boundary, wherein the setpoints comprise points located on the boundary of the patch of points, and wherein the reference RGT surface between setpoints located on the boundary of the patch of points is obtained from said patch of points.

3. The method according to claim 2, wherein obtaining a patch of points comprises defining a seed on a seismic trace of the seismic image and propagating laterally the seed by searching for pixels of adjacent seismic traces that satisfy a predetermined criterion of similarity with the seed.

4. The method according to claim 1, wherein the value of the weighting coefficient used for the vertical position of an RGT surface is:

substantially equal to one if the at least one horizontal position of the respective point of the reference RGT surface is equal to the at least one horizontal position of the setpoint associated with the respective RGT surface; and substantially equal to zero if the at least one horizontal position of the respective point of the reference RGT surface is equal to the at least one horizontal position of the setpoint associated with a different RGT surface.

5. The method according to claim 1, wherein the reference RGT surface is defined by:

$$S_{ref}(i, j) = \sum_{n=1}^{N_{setpoint}} w^n(i, j) \times S^n(i, j)$$

wherein:

$S_{ref}(i,j)$ is the vertical position of the point of the reference RGT surface $S_{ref}$ having the horizontal positions $(i,j)$;

$N_{setpoint}$ is a total number of the setpoints;

$S^n$ is the RGT surface retrieved for the setpoint of index $n$;

$S^n(i,j)$ is the vertical position of the point of the RGT surface $S^n$ having the horizontal positions $(i,j)$; and $w^n(i,j)$ is the weighting coefficient used for the vertical position of the RGT surface $S^n$ for the horizontal positions $(i,j)$.

6. The method according to claim 5, wherein the weighting coefficient used for the vertical position of the RGT surface is defined by:

$$\begin{cases} w^n(i_n, j_n) = 1 \text{ and } w^n(i_m, j_m) = 0 \forall\, m \neq n \\ w^n(i, j) = \dfrac{F^n(i, j)}{F(i, j)} \text{ if } (i, j) \neq (i_n, j_n) \text{ and } (i, j) \neq (i_m, j_m) \forall\, m \neq n \end{cases}$$

wherein:

$$F^n(i, j) = [dist((i, j), (i_n, j_n))]^{-\alpha}$$

$$F(i, j) = \sum_{n=1}^{N_{setpoint}} F^n(i, j)$$

wherein:

$(i_n, j_n)$ are the horizontal positions of the setpoint of index $n$;

$dist((i,j), (i_n, j_n))$ is the distance in the horizontal plane between the point having the horizontal positions $(i,j)$ and the horizontal positions $(i_n, j_n)$ of the setpoint of index $n$; and $\alpha > 1$ is a predetermined factor.

7. The method according to claim 6, wherein α>2 and/or α<60.

8. The method according to claim 5, wherein the weighting coefficient used for the vertical position of the RGT surface is defined by:

$$w^n(i, j) = \frac{F'^n(i, j)}{F'(i, j)}$$

wherein:

$$F'^n(i, j) = \frac{1}{\exp([dist((i, j), (i_n, j_n))]^\alpha)}$$

$$F'(i, j) = \sum_{n=1}^{N_{setpoint}} F'^n(i, j)$$

wherein:

$(i_n, j_n)$ are the horizontal positions of the setpoint of index n;

$dist((i,j), (i_n,j_n))$ is the distance in the horizontal plane between the point having the horizontal positions (i,j) and the horizontal positions $(i_n,j_n)$ of the setpoint of index n; and α>1 is a predetermined factor.

9. The method according to claim 1, comprising converting to frequency-domain the reference RGT surface.

10. The method according to claim 9, wherein the seismic image includes a plurality of seismic traces, and converting to frequency-domain the reference RGT surface comprises:

determining an intersection point between each seismic trace and the reference RGT surface;

selecting an interval of pixels of each seismic trace, said interval of pixels being centered on the intersection point; and converting to frequency-domain the values of each interval of pixels, thereby obtaining a plurality of frequency-domain representations of the reference RGT surface associated with respective analysis frequencies.

11. The method according to claim 10, comprising selecting three analysis frequencies and generating a red-green-blue (RGB) image of the reference RGT surface based on three frequency-domain representations of the plurality of frequency-domain representations associated respectively with the three selected analysis frequencies.

12. A non-transitory computer-readable storage medium comprising instructions which, when executed by at least one processor, configure said at least one processor to carry out the processing method of claim 1.

13. A computer system for processing a seismic image, said computer system comprising at least one processor configured to carry out the processing method of claim 1.

\* \* \* \* \*